United States Patent [19]

Gerkin et al.

[11] Patent Number: 4,960,942
[45] Date of Patent: Oct. 2, 1990

[54] PROCESS FOR THE MANUFACTURE OF N-(POLYOXYALKYL)-N-(ALKYL)AMINES

[75] Inventors: Richard M. Gerkin, Cross Lanes; David L. Kirchner, South Charleston, both of W. Va.

[73] Assignee: Union Carbide Chemicals and Plastics Company Inc., Danbury, Conn.

[21] Appl. No.: 195,010

[22] Filed: May 17, 1988

[51] Int. Cl.$^5$ ............................................. C07C 85/06
[52] U.S. Cl. ..................................................... 564/479
[58] Field of Search ........................................... 564/479

[56] References Cited

U.S. PATENT DOCUMENTS

| | | |
|---|---|---|
| 3,373,204 | 3/1968 | Hales . |
| 4,286,074 | 8/1981 | Davis . |
| 4,404,404 | 9/1983 | Swift . |
| 4,409,399 | 10/1983 | Swift . |
| 4,417,075 | 11/1983 | Stogryn . |
| 4,442,306 | 4/1984 | Mueller . |
| 4,625,063 | 11/1986 | Yokota . |
| 4,683,336 | 7/1987 | Blackhurst . |
| 4,686,242 | 8/1987 | Turner . |

FOREIGN PATENT DOCUMENTS

| | | |
|---|---|---|
| 3432015 | 3/1986 | Fed. Rep. of Germany . |
| 3539266 | 5/1987 | Fed. Rep. of Germany . |
| 58-98448 | 12/1984 | Japan . |
| 62-33138 | 2/1987 | Japan . |
| 62-51646 | 3/1987 | Japan . |
| 1033912 | 6/1966 | United Kingdom . |

*Primary Examiner*—Frederick E. Waddell
*Attorney, Agent, or Firm*—Bonnie L. Deppenbrock

[57] ABSTRACT

The present invention provides a novel process for manufacturing N-(polyoxyalkyl)-N-(alkyl) amines. The process is characterized by reacting a polyetheramine in which the amine groups are predominantly primary in character with a low molecular weight, sterically hindered alcohol in the presence of an appropriate catalyst, such as nickel using specific reaction conditions.

15 Claims, No Drawings

PROCESS FOR THE MANUFACTURE OF N-(POLYOXYALKYL)-N-(ALKYL)AMINES

BACKGROUND OF THE INVENTION

1. Field of the Invention

The present invention relates to a process for the manufacture of N (polyoxyalkyl)-N-(alkyl)-amines by reacting in one step a polyetheramine in which the amine groups are predominently primary in character with a low molecular weight, sterically hindered alcohol. These N-(polyoxyalkyl)-N-(alkyl)-amines are characterized by a high content of secondary amine groups.

2. Prior Art

Amination of polymeric alcohols with ammonia under various reaction conditions to produce primary amines is well known. Similarly, it is also well known that low molecular weight primary amines react with low molecular weight alcohols to form secondary amines, and low molecular weight secondary amines react with low molecular weight alcohols to form tertiary amines.

In U.S. Pat. No. 4,638,336 amines are prepared from an aliphatic alcohol and, as aminating agents ammonia, a primary amine and a secondary amine. When the secondary amine was used, the product was a tertiary amine.

In DE 3,539,266 tertiary amines were prepared from the reaction of secondary amines with alcohols in the presence of a hydrogenation/dehydrogenation catalyst.

In JP 62 51646 alpha, omega ditertiary amines formed from the reaction of an alpha, omega diol and a secondary amine in the presence of hydrogen and copper or cobalt catalyst.

In DE No. 3,432,015 very high tertiary amines were derived from the reaction of dimethylamine amine and a C12 alcohol. Copper/tin and other catalysts were discussed.

In U.S. Pat. No. 4,625,063 high purity tertiary amines formed from the reaction of an alcohol and a primary or secondary amine where the catalyst contained copper/nickel and a Group VIII metal.

In JP 59-222,448 alkyldimethylamines were produced from the reaction of dimethylamine and an alcohol.

In U.S. Pats. Nos. 4,404,404 and 4,409,399 tertiary amines were derived from the reaction of dimethylamine and dodecanol in the presence of copper on nickel oxide catalysts.

In U.S. Pat. No. 4,442,306 tertiary amines were produced from the reaction of alcohol and a secondary amine using a copper formate catalyst.

In JP No. 62 33138 there is described a special catalyst for controlling the reaction of secondary amines with alkane diols to give mono- and ditertiary amine products.

However, no art teaches the direct manufacture of polyetheramines having a high secondary amine content by directly reacting a polyol with a primary amine. In fact, the only related art, U.S. Pat. No. 4,686,242, teaches that only low levels (less than 40% of total amine) of secondary amine terminated polyethers can be obtained when one attempts to directly manufacture the secondary polyetheramine from primary amines and a polyether polyols.

Another method for preparing a secondary polyetheramine is described in U.S. Pat. No. 4,286,074, where a pre made primary polyetheramine is first allowed to react with acetone to form the resulting ketimine. This product is hydrogenated to the expected high secondary amine containing product. Although this process is technically feasible for polyetheramines of other molecular weights and functionalities, it is not very efficient or economically attractive and the current commercial suppliers of primary polyetheramines are quite limited.

These patents clearly indicate that it is generally expected from the art that a primary amine, when reacted with an alcohol, should form the art expected secondary amine. However, as noted in U.S. Pat. No. 4,686,242, the reaction actually generates a product which is predominantly primary amine in character. It has now been discovered that it is possible to overcome this limitation by reacting a polyetheramine in which the amine groups are predominantly primary in character with a sterically hindered, low molecular weight alcohol to obtain high levels of secondary amine termination on the polyetheramine.

OBJECT OF THE INVENTION

It is a primary object of the present invention to provide N (polyoxyalkyl)-N-(alkyl) amines wherein the content of secondary amine groups exceeds the content of primary and tertiary amine groups.

It is another object of the present invention to provide a novel route to such amines via the reaction of alcohols with primary polyetheramines.

Other objects of the invention will be made apparent from the description and examples which follow.

SUMMARY OF THE INVENTION

The present invention provides a novel process for manufacturing N-(polyoxyalkyl) N (alkyl) amines. The process is characterized by reacting a polyetheramine in which the amine groups are predominantly primary in character with a low molecular weight, sterically hindered alcohol in the presence of an appropriate catalyst, such as nickel, using specific reaction conditions.

DETAILED DESCRIPTION OF THE INVENTION

In accordance with the present invention there is provided a process for manufacturing N-(polyoxyalkyl) N-(alkyl)amines by direct, catalytic reaction of a polyetheramine in which the amine groups are predominantly primary in character with a sterically hindered, low molecular weight alcohol.

The polyetheramines are those having a molecular weight of at least 400, preferably 2000 or more, and having a primary amine content relative to the total amine content of 50 percent or more and preferably 90 percent or more. The amine content is generally measured as milliequivalents per gram. Such polyetheramines are well known in the art and typical examples are such commercially available materials as Jeffamine ™ T-403, D-2000, T-3000 and T-5000.

The sterically hindered, low molecular weight alcohols are those represented by the formula $R'''OH$ wherein $R'''$ is a secondary or tertiary alkyl or aryl group containing from 3 to 18 carbon atoms, preferably 3 to 6 carbon atoms and most preferably an isopropyl group. Examples of such alcohols are phenol, sec-butanol, cyclohexanol, t-butanol and most preferably isopropanol.

The product of the present process is an N-(polyoxyalkyl)-N-(alkyl)amine of the general formula: $R[X]_{(hz)}[(Y)_p(Z)_s(T)_t]_z$-(hz) wherein R is an initiator radical based on a compound containing Zerewitinoff active hydrogen atoms. Such compounds are capable of initiating polymerization with alkylene oxides when used with a suitable catalyst (e.g., potassium hydroxide, zinc hexacyanoco-baltate).

Examples of such compounds include but are not limited to: monofunctional compounds such as methanol, butanol, phenol, nonylphenol, lauryl alcohol, 2-methoxyethanol; difunctional compounds such as ethylene glycol, propylene glycol, water, 1,4 butanediol, diethylene glycol; trifunctional compounds such as trimethylolpropane, glycerine; and other polyfunctional compounds such as pentaerythritol, sorbitol, ammonia, ethylene diamine, 1,3 diaminopropane, 1,6 hexanediamine, isomers of phenylenediamine and toluenediamine, 4,4'-diphenylmethane diamine and its isomers, diethanolamine, ethanolamine, dimethylethanolamine N-methylethanolamine, triethanolamine, triisopropanolamine, ethylmercaptan, thiophenol and propylene disulfide.

Additional examples of compounds suitable for initiating polymerization of alkylene oxides are the various oligomeric polyols known in the art. These include the poly-(1,4-butylene oxide)polyethers and the hydroxyl and amine terminated poly-(butadienes). When polyols (or other oligomers) are used for initiating polymerization of the alkylene oxides, their molecular weights can range from 400 to about 3000. When the conventional initiators such as described above (i.e., glycerine, water, etc.) are used, their molecular weight can range from about 18 (for water) up to about 400. Preferably R contains from two to six carbon atoms and most preferably three to six carbon atoms.

The alkylene oxides that find utility in the present invention are those well known in the art. These include propylene oxide, ethylene oxide, the alpha olefin oxides such as 1,2-epoxybutane and 1,2-epoxyoctadecane, oxytane and tetrahydrofuran. "X" denotes the group represented by the formula:

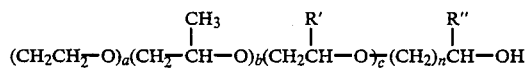

"Y" denotes the group represented by the formula:

"Z" denotes the group represented by the formula:

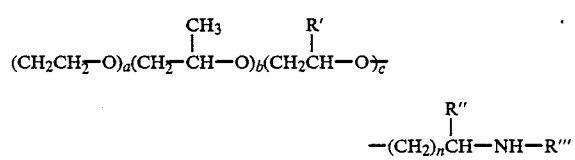

"T" denotes the group represented by the formula:

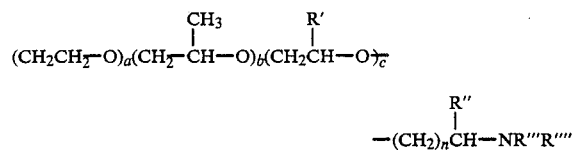

wherein:
the letter "a" defines the ethylene oxide content of the N (polyoxyalkyl) N-(alkyl)amine and e from a value of zero to 175. The preferred range for "a" is 0 to 90. When b or c is not equal to zero, the most preferred range for "a" is 0 to 50.

The letter "b" defines the propylene oxide content of the N (polyoxyalkyl)-N (alkyl)amine and can also range from a value of zero to 175. Preferably, "b" should range from 20 to 115 and most preferably from 25 to 98.

The letter "c" defines the alpha olefin oxide

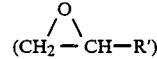

content of the N (polyoxyalkyl)-N-(alkyl) amine and can range from 0 to 30. Preferably, "c" can range from zero to 15 and most preferably, from 0 to 2.

The letter "n" equals from 1 to 3, preferably 1.

Two aspects of a, b and c are important and must be noted. The first is that the sum of a+b+c must always be greater than or equal to 2 when n equals 1. Second, a, b and c indicate ethylene oxide, propylene oxide and alpha olefin oxide which can be incorporated into the product backbone in any sequence, i.e., blocks or random sequence, in any configuration.

R' is an alkyl group containing from two carbon atoms to eighteen carbon atoms depending on the alpha olefin oxide used in preparation of the amine. While R' can contain up to eighteen carbon atoms, two carbon atoms are most preferred.

R" is hydrogen or an alkyl group containing up to eighteen carbon atoms. It is preferred that R" is hydrogen or alkyl group containing up to two carbons, and most preferably a methyl group.

R''' is a secondary or tertiary alkyl or aryl group containing from three to eighteen carbon atoms, preferably three to six carbon atoms and most preferably an isopropyl group.

R'''' is an alkyl or aryl group containing from two to twelve carbon atoms, preferably an alkyl group containing from two to six carbon atoms, and most preferably an isopropyl group.

The letter "h" indicates the relative hydroxyl content remaining after amination and has been found to range from 0 to 0.7 with 0.1 to 0.3 preferred and 0 to 0.15 most preferred. As noted, "h" is related to the percent amination, i.e. 30 percent amination would result in a hydroxyl content of 70 percent and thus "h" would equal 0.7. Values are obtained by taking the total amine number as measured in milliequivalents per gram, and dividing by the initial hydroxyl number (meg/g) and subtracting that quotient from 1.0.

The letter "p" indicates the relative primary amine content to total amine content formed during amination and is from 0 to 0.4.

The letter "s" indicates the relative secondary amine content to total amine content formed during amination and is from 0.5 to 1.0, preferably from 0.70 to 1.0.

The letter "t" indicates the relative tertiary amine content to total amine content formed during amination and is from 0 to 0.15, preferably 0 to 0.05. The sum of p, s and t must equal 1.0.

The letter "z" is an integer derived from the number of Zerewitinoff active hydrogens on the initiator. The letter "z" is preferably 1 to 6, and most preferably 3 to 6.

The present invention can also be practiced by charging a polyether polyol and ammonia in place of the polyetheramine and allowing the sterically hindered, low molecular weight alcohol to react with the high molecular weight polyetheramine formed in situ. However, because of the competing reactions this is not a preferred route.

The reaction is carried out in a batch autoclave at elevated temperature, generally between 175° C. to 250° C. and preferably 190° C. to 240° C. The reaction pressure will range from 250 to 2000 psi, preferably 500 to 1250 psi. The reaction is run in the presence of hydrogen. Under these conditions the amine containing polymer remains in the liquid phase. The stoichiometry on a amine to hydroxyl equivalent basis will range from 1:2 to 1:20, preferably 1:5 to 1:10. The reaction will generally occur in 4 to 24 hours. The catalyst is a nickel, copper or cobalt based catalyst, most preferably nickel, either unsupported or on a support. When the catalyst is supported, the metal content is at least 25%, with 50% or more preferred. The catalyst loading is generally on the order of 1 to 5 weight percent based on total charge.

In addition to the batch process described above, the amination can be carried out using a liquid phase continuous amination process. In this process, a pelletized or extruded form of the nickel, copper or cobalt catalyst on a support, most preferably nickel, is charged to a high pressure tubular reactor. The reactor is heated to 175° C. to 250° C., preferably 190° C. to 240° C. and a mixture of primary amine terminated polyether and alcohol (1:2 to 1:20, preferably 1:5 to 1:10 on an equivalents basis) is pumped through the reactor at a flow rate ranging from about 0.5 to 5.0 g feed/g catalyst/hr. Hydrogen is added to the feed stream at a minimum rate of 1, standard cc/min. Reactor pressure is controlled by a back pressure regulator to 25% to 2000 psi, preferably 500 to 120psi. The products isolated from the continuous process are similar to those isolated from the batch process.

The N (polyoxyalkyl)-N (alkyl)amines of the present invention find utility in the preparation of polyureas and polyurethane urea products.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Polyetheramine #1=A 5000 MW primary triamine polyether, commercially available from Texaco Chemical Company as Jeffamine ™ T-5000.

Catalyst #1=Ni-5136P, a 65% Ni on silica alumina support in powdered form, made commercially by Harshaw-Filtrol Partnership.

Example #1: Polyetheramine #1 (1204.1 g.), isopropyl alcohol (424.7 g), and Catalyst #1 (42.1 g) were charged to a 1 gallon reactor. The reactor was purged with hydrogen to remove air and pressurized to 200 psi with hydrogen. The system was heated to 190° C. and held at temperature for about 20 hours. Filtration of the catalyst and removal of the excess volatile materials gave a product with the following analysis: total amine was 0.496 meg/g, primary amine was 0.063 meg/gm, and tertiary amine was 0.002 meg/gm. The secondary amine, by difference, was 0.431 meg/gm, i.e., 86% of the total amine.

COMPARATIVE EXAMPLE #1

Example #1 was repeated with the exception that the isopropyl alcohol was replaced with the equivalent mole ratio of methanol. Polyetheramine #1 (1734.0 g.), methanol (336.4 g.), and Catalyst #1 (46.4 g.) were charged to a 1 gallon reactor. The reactor was purged with hydrogen, pressurized to about 200 psi with hydrogen, then heated to about 190 deg C. for about 22.5 hours. The product had the following analyses: total amine was 0.484 meg/gm; primary amine was 0.040 meg/gm; and tertiary amine was 0.434 meg/gm. The secondary amine, by difference, was 0.020 meg/gm, i.e., 4% of the total amine.

COMPARATIVE EXAMPLE #2

Example #1 was repeated with the exception that the isopropyl alcohol was replaced with the equivalent mole ratio of ethanol. Polyetheramine #1 (810.0 g.), ethanol (225.8 g.), and Catalyst #1 (23.3 g.) were charged to a 2 liter reactor. The reactor was purged with hydrogen, pressurized to about 200 psi with hydrogen, then heated to about 190 deg C. for about 19 hours. The product had the following analyses: total amine was 0.477 meg/g; primary amine was 0.058 meg/gm; tertiary amine was 0.422 meg/g. The secondary amine, by difference, was 0.039 meg/gm; i.e., 8% of total amine.

COMPARATIVE EXAMPLE #3

Example #1 was repeated with the exception that isopropyl alcohol was replaced with the equivalent mole ratio of n propanol. Polyetheramine #1 (1374.0 g.), n-propanol (499.7 g.), and Catalyst #1 (42.1 g.) were charged to a 1 gallon reactor. The reactor was purged with hydrogen, pressurized to about 200 psi with hydrogen, then heated to about 190 deg C. for about 18.5 hours. The product had the following analyses: total amine was 0.401 meg/gm; primary amine was 0.025 meg/gm; and tertiary amine was 0.315 meg/g. The secondary amine, by difference, was 0.063 meg/gm; i.e., 16% of total amine.

We claim:

1. A process for the manufacture of N-(polyoxyalkyl)-N-(alkyl)amines of the general formula:
R[X]$_{(hz)}$[(Y)$_p$(Z)$_x$(T)$_t$]$_{z-(hz)}$
wherein: R is an initiator radical based on a compound containing Zerewitinoff active hydrogen atoms.

"X" is a group represented by the formula:

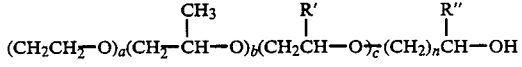

"Y" is the group represented by the formula:

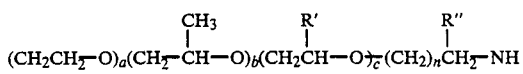

"Z" is a group represented by the formula:

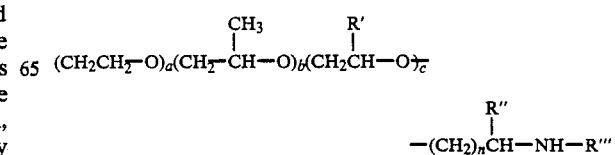

"T" is a group represented by the formula:

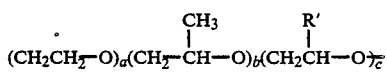

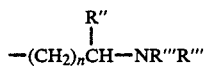

a is 0 to 175,
b is 0 to 175,
c is 0 to 30,
n is 1 to 3,
a+b+c is equal to or greater than 2 when n is 1,
R' is an alkyl group containing from two carbon atoms to eighteen carbon atoms,
R" is hydrogen or an containing up to eighteen carbon atoms,
R'" is a secondary or tertiary alkyl or group containing from three to eighteen carbon
R"" is an alkyl or aryl group containing to twelve carbon atoms,
h is 0 to 0.7,
p is 0 to 0.4,
s is 0.5 to 1.0,
t is 0 to 0.15,
p+s+t =1.0, and
z is 1 to 6,
which process comprises reacting an alcohol of the formula:
R'"OH
wherein R'" is as defined above, with a polyetheramine having a molecular weight of at least and a primary amine content, relative to the total amine content, of at least 50 percent, said process being carried out at a temperature of from 175° to 250° C. and a pressure of 250 to 2000 psi in the presence of hydrogen and a catalyst.

2. The process of claim 1 wherein the polyetheramine has a molecular weight of at least 2000.

3. The process of claim 1 wherein the polyetheramine has a primary amine content, relative to the total amine content, of at least 90 percent.

4. The process of claim 3 wherein the polyetheramine has a molecular weight of at least 2000.

5. The process of claim 1 wherein the alcohol is a secondary alcohol.

6. The process of claim 5 wherein the alcohol is isopropanol.

7. The process of claim 4 wherein the alcohol is isopropanol.

8. The process of claim 1 wherein the temperature is 190° C. to 240° C.

9. The process of claim 1 wherein the pressure is 500 to 1250 psi.

10. The process of claim 1 wherein the catalyst is nickel.

11. A process for the manufacture of N-(polyoxyalkyl)-N-(alkyl)amines of the general formula:
R[X]$_{(hz)}$[(Y)$_p$(Z)$_s$(T)$_t$]$_{z-(hz)}$ wherein: R is an initiator radical based on a compound containing Zerewitinoff active hydrogen atoms.
wherein: R is an initiator radical based on a compound containing Zerewitinoff active hydrogen atoms.

"X" is a group represented by the formula:

"Y" is the group represented by the formula:

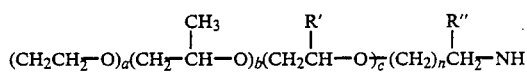

"Z" is a group represented by the formula:

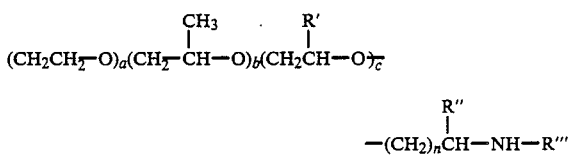

"T" is a group represented by the formula:

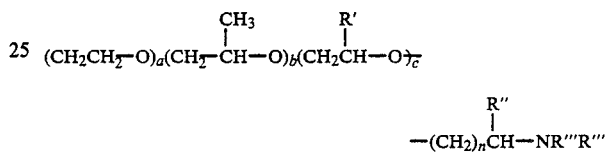

a is 0 to 175,
b is 0 to 175,
c is 0 to 30,
n is 1 to 3,
a+b+c is equal to or greater than 2 when n is 1,
R' is an alkyl group containing from two carbon atoms to eighteen carbon atoms,
R" is hydrogen or an alkyl group containing up to eighteen carbon atoms,
R'" is a secondary or tertiary alkyl or aryl group containing from three to eighteen carbon atoms,
R"" is an alkyl or aryl group containing from two to twelve carbon atoms,
h is 0 to 0.7,
p is 0 to 0.4,
s is 0.5 to 1.0,
t is 0 to 0.15,
p+s+t=1.0, and
z is 1 to 6,
which process comprises reacting an alcohol of the formula:
R'" OH
wherein R'" is as defined above, with a polyetheramine having a molecular weight of at least 2000 and a primary amine content, relative to the total amine content, of at least 90 percent, said process being carried out at a temperature of from 175° to 250° C. and a pressure of 250 to 2000 psi in the presence of hydrogen and a nickel catalyst.

12. The process of claim 11 wherein the alcohol is a secondary alcohol.

13. The process of claim 12 wherein the alcohol is isopropanol.

14. The process of claim 11 wherein the temperature is 190° C. to 240° C.

15. The process of claim 11 wherein the pressure is 500 to 1250 psi.

* * * * *

UNITED STATES PATENT AND TRADEMARK OFFICE
CERTIFICATE OF CORRECTION

PATENT NO. : 4,960,942
DATED : October 2, 1990
INVENTOR(S) : Richard M. Gerkin; David L. Kirchner It is certified that error appears in the above-identified patent and that said Letters Patent is hereby corrected as shown below:

Column 7, line 17, insert --alkyl group-- before "containing".

Column 7, line 19, insert --aryl-- before "group".

Column 7, line 20, insert --atoms-- after "carbon".

Column 7, line 21, insert --from two-- after "containing".

Column 7, line 34, insert --400-- after "at least".

Signed and Sealed this

Twenty-third Day of June, 1992

Attest:

DOUGLAS B. COMER

*Attesting Officer*  Acting Commissioner of Patents and Trademarks